No. 713,227. Patented Nov. 11, 1902.
C. W. LEVALLEY.
SET COLLAR FOR SHAFTING.
(Application filed Aug. 15, 1901.)
(No Model.) 2 Sheets—Sheet 1.
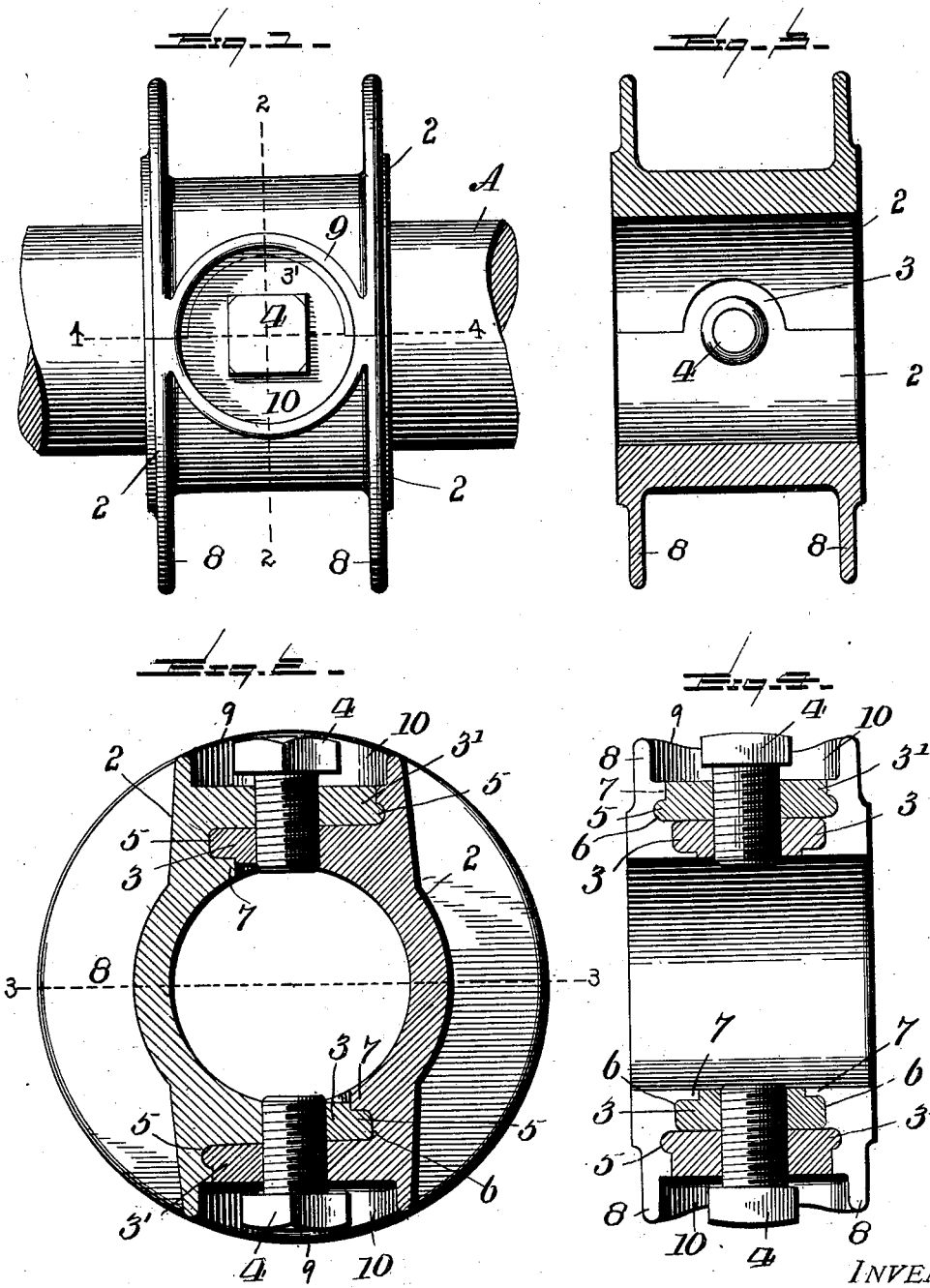
WITNESSES:
Wm. F. Doyle.
H. N. Low
INVENTOR
Christopher W. Levalley
BY J. S. Barker
Attorney No. 713,227.  
C. W. LEVALLEY.  
SET COLLAR FOR SHAFTING.  
(Application filed Aug. 15, 1901.)  
Patented Nov. 11, 1902.
(No Model.) 2 Sheets—Sheet 2.
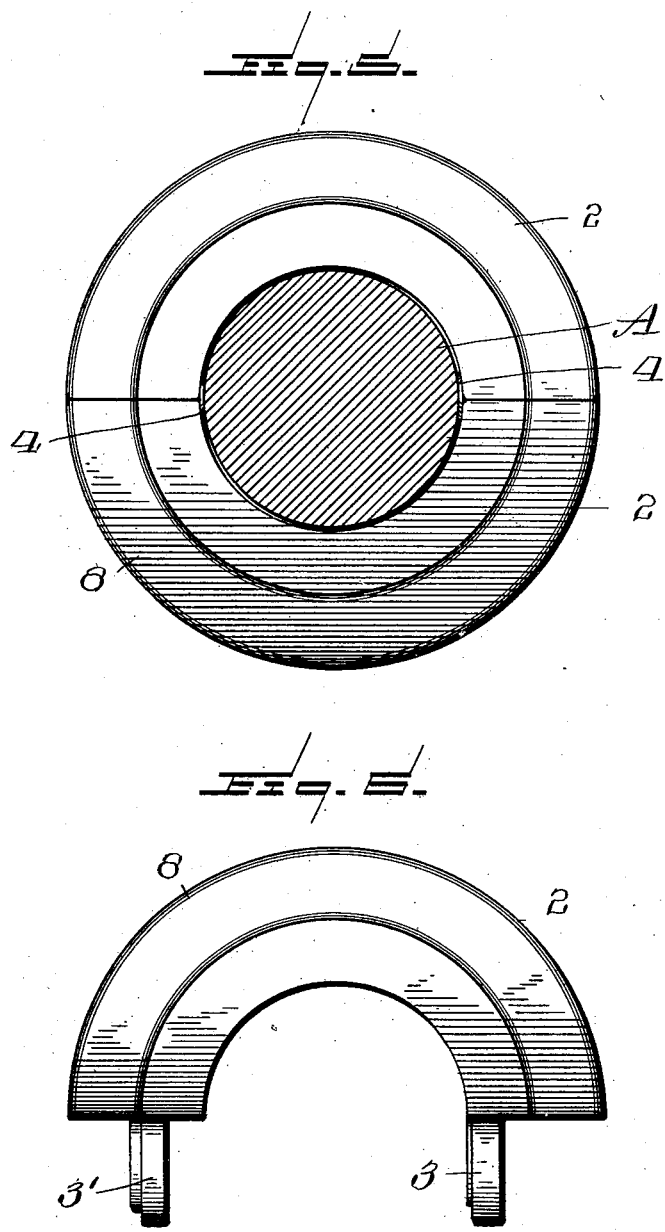

UNITED STATES PATENT OFFICE.

CHRISTOPHER W. LEVALLEY, OF MILWAUKEE, WISCONSIN.

SET-COLLAR FOR SHAFTING.

SPECIFICATION forming part of Letters Patent No. 713,227, dated November 11, 1902.

Application filed August 15, 1901. Serial No. 72,175. (No model.)

*To all whom it may concern:*

Be it known that I, CHRISTOPHER W. LE-VALLEY, a citizen of the United States, residing at Milwaukee, in the county of Milwaukee and State of Wisconsin, have invented certain new and useful Improvements in Set-Collars for Shafting, of which the following is a specification.

My invention has for its object to produce an improved set-collar for shafting which is particularly adapted for use upon high-speed or fast-running shafts and which possesses other desirable characteristics, that will be hereinafter pointed out.

In the accompanying drawings, Figure 1 is a plan view of a set-collar embodying my invention represented as being applied to a shaft. Fig. 2 is a cross-sectional view taken on the line 2 2 of Fig. 1. Fig. 3 is an inside face view of one of the sections of which the collar is formed. Fig. 4 is a section taken on the line 4 4 of Fig. 1. Fig. 5 is an end view of the collar secured to a shaft, the shaft being shown in section. Fig. 6 is an end view of one of the sections of which the collar is composed.

The collar is formed of two parts or sections which are exact duplicates of each other, thus very much reducing the cost and labor incident to the manufacture and fitting of the parts and also preventing the liability of mistakes being made in supplying and assembling the parts for ordinary use.

In the drawings, A represents a shaft to which a collar embodying my invention is represented as being applied. The two sections of the collar are indicated by 2 2, and these are interiorly bored or shaped to fit the shaft. The parts 2 of the collar are of substantially cylindrical segmental shape. They are provided at their respective ends with overlapping lugs or projections 3 3', which are diametrically opposite each other and are perforated and screw-threaded to receive the bolts 4, which serve to unite the sections to form the complete collar and also to set or clamp the same to the shaft A. As will be seen by reference to Figs. 3 and 6, one of the lugs or projections 3 is situated nearer to the center or axis of the collar than the other lug or projection 3' and for the manifest purpose of permitting the lugs upon the opposite sections to overlap when they are brought together to form the complete collar. Each of the lugs or projections is preferably provided with a peripheral flange 5, which is adapted to engage with a groove or recess 6, formed to receive it, and thus secure an interlocking of the sections of the collar where they come together. The grooves or recesses 6 are preferably formed by flanges 7, which are arranged opposite to adjacent faces of the projections or lugs 3 3'.

The segments 2 of the collar are preferably provided at their opposite sides or edges with relatively high flanges 8 8. They are also preferably formed with exterior curved flanges 9, which extend between the flanges 8 and bound the projections 3 3' and constitute circular rims around sockets 10, in which are arranged the heads of the bolts 4. The flanges 9 are substantially the same height as the flanges 8 and are high enough to completely shield or guard the heads of the bolts when they are set to place, so that the complete collar has no projecting part beyond the circle formed by the outer edge of the flanges 8.

It will be observed that the contacting faces of the overlapping projections, which are carried by the segmental sections of the collar, are arranged substantially tangential to the shaft or to circles which are concentric therewith and that the apertures through these projections are radial, so that the bolts which serve to unite the sections of the collar may also serve as the set-bolts for securing the collar to the shaft. It should also be noted that the sections are separable on a plane which cuts the shaft diametrically and that the overlapping projections with which the sections are provided are arranged at right angles to the said plane and also at right angles to the planes of the end faces of the collar.

Among the advantages incident to my invention the following may be noted: The collar is perfectly balanced, being formed of parts which are exact counterparts one of the other, and for this reason it is especially adapted for use upon shafting run at a very high speed. Another feature is that it has no projecting parts, such as the exposed heads of screws or set-bolts, which are adapted to catch upon clothing or any other loose article to the danger of life and property. Another feature of great practical advantage and incident to the construction is that the collar may be applied to the shaft where the amount of space is limited, as no lateral movements of either section is required in fitting the parts together. If there is sufficient space upon the shaft for the collar, it may easily be applied or removed. The advantages in manufacture and use incident to the collar being made of sections which are duplicates of each other have been already pointed out.

Having described my invention, what I claim, and desire to secure by Letters Patent, is—

1. A set-collar for shafting comprising segmental sections which are separable on a plane which cuts the shaft diametrically, the sections being provided with overlapping projections which are arranged at right angles to the said plane of separation of the sections and are also at right angles to the planes of the end faces of the collar, substantially as set forth.

2. A set-collar for shafting comprising segmental sections provided with overlapping perforated projections, and bolts which unite the said sections, arranged radially, and to pass through the said projections, whereby they may also be adapted to serve as set-bolts for uniting the collar to the shaft, substantially as set forth.

3. A set-collar for shafting comprising segmental sections provided with overlapping projections whose contacting faces are substantially tangential to circles concentric with the shaft, and means for uniting the sections, substantially as set forth.

4. A set-collar for shafting, comprising segmental sections formed with the perforated lugs 3, 3', the flanges 5 and the recesses 6, with which the flanges are adapted to engage, and bolts which pass through the said lugs and unite sections of the collar, substantially as set forth.

5. A set-collar for shafting, comprising segmental sections which are counterparts of each other, the sections being each provided with diametrically-opposed perforated lugs 3, 3' which are adapted to overlap when the sections are brought together, and the sections being also provided with the flanges 8 around their edges and with flanges 9 which are arranged about the exposed faces of the perforated lugs, and screw-threaded bolts which engage with the said perforated lugs and unite the sections of the collar, the heads of the bolts being within the recesses formed by the flanges, 9, substantially as set forth.

6. A set-collar for shafting, comprising a pair of segments provided with overlapping projections upon diametrically opposite sides of the opening in the collar for the shaft, the engaging faces of the overlapping projections on the opposite sides of the shaft being substantially parallel with each other and arranged in planes substantially at right angles to the plane dividing or separating the two segments, and means passing through the overlapping projections for uniting the segments, substantially as set forth.

CHRISTOPHER W. LEVALLEY.

Witnesses:
V. I. KLOFANDA,
JOSEPH LOCH.